United States Patent [19]

Lamiraux et al.

[11] Patent Number: 5,802,531
[45] Date of Patent: Sep. 1, 1998

[54] METHOD AND SYSTEM FOR EMBEDDING PARTS OF DOCUMENTS AND SYNCHRONIZING MULTIPLE VIEWS THEREOF

[75] Inventors: Henri C. Lamiraux, San Carlos; Anthone Michael Burbidge, Gilroy, both of Calif.

[73] Assignee: Apple Computer, Inc., Cupertino, Calif.

[21] Appl. No.: 436,116

[22] Filed: May 8, 1995

[51] Int. Cl.$^6$ .................................................. G06F 5/00
[52] U.S. Cl. ............................ 707/514; 707/515; 707/516
[58] Field of Search ............................. 395/145–147, 395/153, 161, 700, 776, 777, 778, 788, 792, 680, 682, 683; 707/514, 515, 516, 513, 526, 530, 901, 902

[56] References Cited

U.S. PATENT DOCUMENTS

| | | | |
|---|---|---|---|
| 5,212,770 | 5/1993 | Smith et al. | 395/155 |
| 5,339,430 | 8/1994 | Lundin et al. | 395/700 |
| 5,345,551 | 9/1994 | Shelley et al. | 395/157 |
| 5,475,805 | 12/1995 | Murata | 395/145 |
| 5,479,601 | 12/1995 | Matheny et al. | 395/155 |
| 5,485,617 | 1/1996 | Stutz et al. | 395/700 |
| 5,499,333 | 3/1996 | Doudnikoff et al. | 395/153 |

FOREIGN PATENT DOCUMENTS

| | | |
|---|---|---|
| 0578207 | 1/1994 | European Pat. Off. . |
| WO 9525999 | 9/1995 | European Pat. Off. . |
| WO 9414115 | 6/1994 | WIPO . |

OTHER PUBLICATIONS

Brockschmidt, *Inside OLE 2*, Microsoft Corporation, 1994, pp. 501, 642, 668–675 and 846.

Danuloff, *The System 7 Book*, Ventana Press, 1991, pp. 201–233.

*Primary Examiner*—Joseph R. Burwell
*Assistant Examiner*—Stephen Hong
*Attorney, Agent, or Firm*—Burns, Doane, Swecker & Mathis, L.L.P.

[57] ABSTRACT

The embedding of parts within one another, and synchronization of their various views, is implemented by means of a data structure consisting of two major components. One component, a display list, comprises a list of frames, or other container structures, in which a part of interest is displayed. The second component of the data structure is a proxy run, run identifies each part that is embedded in the part of interest. Together, these two data components define a matrix structure, in which there is a row for each embedded frame in a part, and a column for each frame within which the part is displayed, or vice versa. This structure provides a mechanism to keep the size and shape of corresponding embedded frames, which are displayed in different views, synchronized with one another.

24 Claims, 4 Drawing Sheets

METHOD AND SYSTEM FOR EMBEDDING PARTS OF DOCUMENTS AND SYNCHRONIZING MULTIPLE VIEWS THEREOF

FIELD OF THE INVENTION

The present invention is directed to user interfaces for computers, and more particularly to user interfaces of the type in which compound documents, and similar types of data structures, comprise different units of information that are embedded within one another.

BACKGROUND OF THE INVENTION

In a user interface of the type to which the present invention is directed, different kinds of information which are created by a user to form components of a document are stored as autonomous objects. In one such interface, these components are known as parts. A part consists of two main aspects, namely contents and an editor, which is also known as a manipulator or handler. The contents of a text part, for example, comprise elements of text, and its editor consists of a software program for creating, editing, viewing and otherwise manipulating the textual contents, e.g., a word processing program. Similarly, a graphic part has contents which consist of graphical elements such as lines, rectangles, circles, and the like, and an editor which can be a drawing or painting program, for example. In this type of user interface, the contents of a part do not exist separate from the editor. Rather, when the part is created, its contents are bound to a particular editor, such that when a user accesses the part, the functionality provided by its bound editor is immediately available to the user. A detailed description of this type of user interface is set forth in copending application Ser. No. 08/058,260, filed May 10, 1993 and Ser. No. 08/175,549, filed Dec. 30, 1993, the disclosures of which are incorporated herein by reference.

A compound document can be created in this type of user interface by embedding one part within another part. Basically, any part can function as a container for another part. Similarly, any part can be contained in another part. A compound document consisting of both text and graphics, for example, can be created by placing a graphic part within a text part, or vice versa to embed one within the other. The containment relationship between the embedded part and the embedding part is determined by a data structure known as a frame. Basically, the frame defines the area in the embedding part within which the embedded part is displayed. Each part maintains its separate identity within its frame, and its contents can be edited within the document by its associated editor.

It is to be noted that, in the context of this type of user interface, the term "document" is not interpreted in a narrow sense to refer only to a two-dimensional presentation of information on a medium such as a sheet of paper or a display screen. Rather, it is employed in a more generic context to refer to any medium in which different types of information can be presented to the user, including a three-dimensional virtual reality image. For example, a part which displays a movie clip can be embedded within a graphic part that represents a three-dimensional room, to simulate projection of the movie onto a wall of the room.

It is sometimes desirable for a user to display multiple views of a document. For example, if a document is displayed within a frame, the user may desire to also view it within a window to permit zooming and scrolling among different portions of the document. If a document with multiple views contains embedded parts, it is preferable to synchronize the different views of the part with one another. Thus, if the user should change the size and/or position of a frame containing an embedded part in one view, the changes should be reflected in the other views as well. The present invention is directed to a procedure and data structure for embedding parts, particularly in a manner that enables different views of parts to be synchronized with one another during the run time of the computer.

SUMMARY OF THE INVENTION

In accordance with the present invention, the embedding of parts within one another and synchronization of their various views is implemented by means of a run-time data structure consisting of two major components. One component, a display list, comprises an identification of frames, or other container structures, in which a part of interest is displayed. As additional views of the part are created on the display, they are added to the display list.

The second component of the data structure is a proxy. For every display frame which is embedded in the part of interest, a proxy is created and added to a list. As additional display frames are embedded in the part of interest, they are added to its proxy list.

Together, these two data components define a matrix structure. This structure can comprise a row for each embedded frame in a part, and a column for each frame within which the containing part is displayed. Each cell of the matrix structure defines an object known as a proxy frame, which represents a respective view of one of the embedded display frames.

This structure provides a mechanism to keep the size and shape of corresponding embedded frames, which are displayed in different views, synchronized with one another.

Further features of the invention, and the advantages offered thereby, are explained in greater detail hereinafter with reference to a specific embodiment illustrated in the accompanying drawings.

DETAILED DESCRIPTION

To facilitate an understanding of the principles which underlie the present invention, it is described hereinafter with reference to its implementation in a user interface of the type described in previously identified application Ser. Nos. 08/058,260 and 08/175,549. In this particular interface, components of information are known as "parts." It will be appreciated that the practical applications of the invention are not limited to this particular implementation. Rather, the invention can be utilized in any user interface in which one component of information can be embedded and displayed in another component of information.

Generally speaking, the present invention is directed to features of a user interface that runs on a computer. While the particular hardware components of a computer system do not form part of the invention itself, they are briefly described herein to provide a thorough understanding of the manner in which the features of the invention cooperate with the components of a computer system to produce the desired results.

Figure 1:
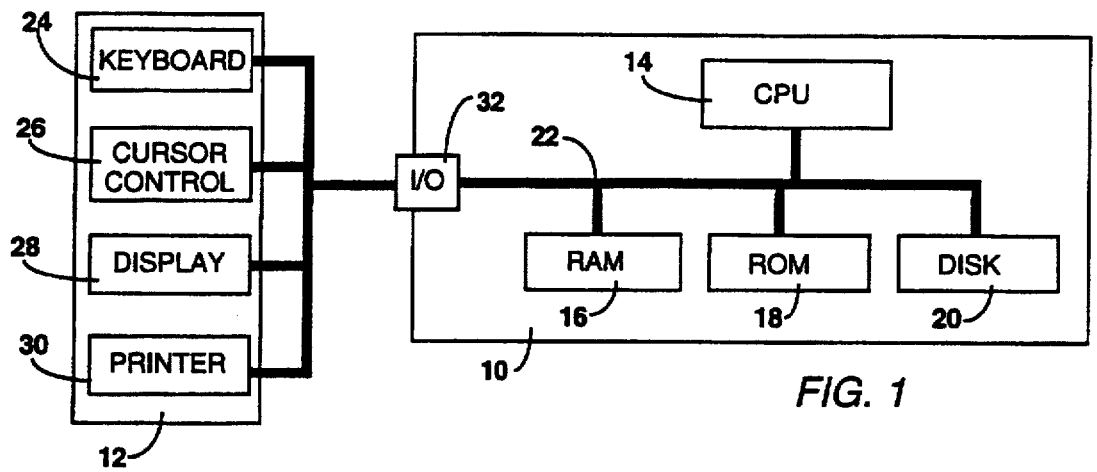
FIG. 1 is a general block diagram of a computer system of the type in which the present invention can be implemented.

Referring to FIG. 1, an exemplary computer system includes a computer 10 having a variety of external peripheral devices 12 connected thereto. The computer 10 includes a central processing unit 14 and associated memory. This memory generally includes a main memory which contains the programs currently being executed on the computer, and which is typically implemented in the form of a random access memory 16. The associated memory also includes a non-volatile memory that can comprise a read-only memory 18, and a permanent storage device, such as a magnetic or optical disk 20, for storing all of the programs, as well as data files. The CPU 14 communicates with each of these forms of memory through an internal bus 22. The peripheral devices 12 include a data entry device such as a keyboard 24, and a pointing or cursor control device 26 such as a mouse, trackball, pen or the like. A display device 28, such as a CRT monitor or an LCD screen, provides a visual display of the information that is being processed within the computer, for example, the contents of a document or a computer-generated image. A hard copy of this information can be provided through a printer 30, or similar such device. Each of these external peripheral devices communicates with the CPU 14 by means of one or more input/output ports 32 on the computer.

Figure 2:
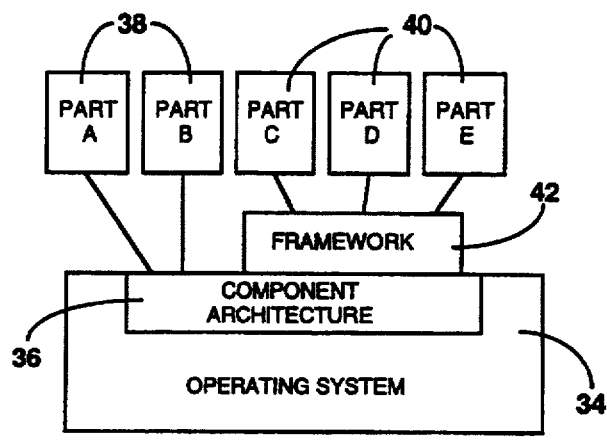
FIG. 2 is a general block diagram of the software architecture for the computer system.

The general architecture of the software which runs on the computer is illustrated in FIG. 2. Referring thereto, the basic operation of the computer, such as writing and reading data to and from the various forms of memory, controlling the display device 28, and communicating with the other peripheral devices, are carried out by its operating system 34. A component architecture 36 comprises part of the operating system, and forms the basis for the user interface via which the user interacts with the computer to control its operation. The component architecture also communicates with the various parts that are currently running on the computer. The parts, and more particularly their editors, can be of two different types. Some of the part editors 38 can be self-contained entities, and communicate directly with the component architecture. Other parts 40 can communicate with the component architecture through a framework 42. The framework provides a basic default architecture for a part, as well as the tools for generic operations that are carried out by all parts. One of these generic operations is the ability to embed other parts, and the handling of embedded parts. For those parts 40 which communicate with the component architecture through the framework 42, they need not include these generic operations within the structure of their editors. Rather, each one need only provide the specialized functions that are associated with that kind of part, e.g. processing text, drawing graphic objects, etc.

The present invention comprises a procedure and associated data structure for embedding parts within one another, and for providing a synchronized appearance of parts throughout multiple views. Preferably, the features of the present invention are incorporated into the framework 42, and thereby provided to all of the parts 40 which communicate with the component architecture through the framework.

Figure 3:
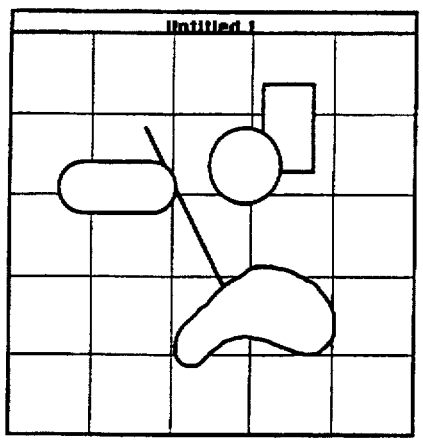
FIG. 3 is a view of a root drawing part.
Figure 4:
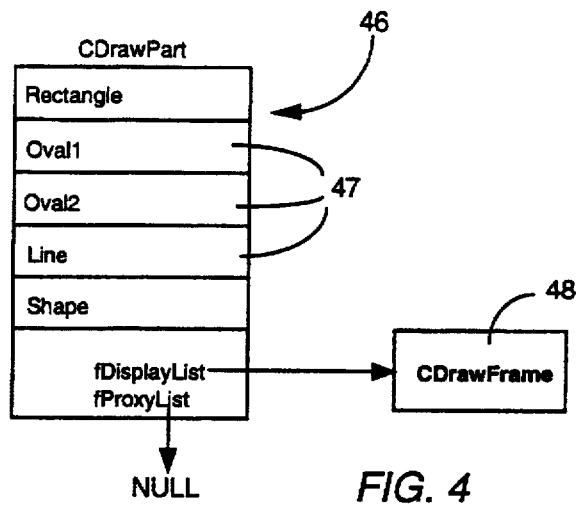
FIG. 4 is a block diagram of the embedding data structure for the view shown in FIG. 3.

To provide a thorough understanding of the invention, it will be described hereinafter with reference to a specific example illustrated in FIGS. 3–10, which together depict the steps that occur in the creation of the data structure. FIG. 3 illustrates an example in which a user has created a graphic document 44, which contains some graphical objects. This document is generated with a drawing part, and forms the root part of the document which functions as a container for all other parts. The root part 44 essentially comprises one instantiation of a class of objects labeled "CDrawPart." When an instantiation of an object is opened, a run-time data structure is generated. The data structure for a particular instantiation of a part contains an identification of specific features which make up that instantiation. For a graphic part, such as that shown in FIG. 3, the data structure includes a description of each graphical object contained in the part. An exemplary data structure 46 for the part 44 is shown in FIG. 4. This data structure is created along with the part, and is stored in the main memory 16 of the computer while the part is displayed on its display device 28. Basically, the data structure contains an entry 47 for each graphical object, describing its size, location and other pertinent information pertaining thereto, such as color, fill pattern, etc.

Included within the data structure for the part are two fields, labeled "fDisplayList" and "fProxyList." The field fDisplayList comprises a list of frames in which the drawing part 44 is currently displayed and the field fProxyList is a list of the parts which are embedded in the root part. In the example of FIG. 3, the part is displayed in a single frame, which forms a document labeled "Untitled 1." This single frame is identified by the entry CDrawFrame 48 in the display list field. There are no embedded frames within the drawing part, and so the list of proxies is empty.

Figure 5:
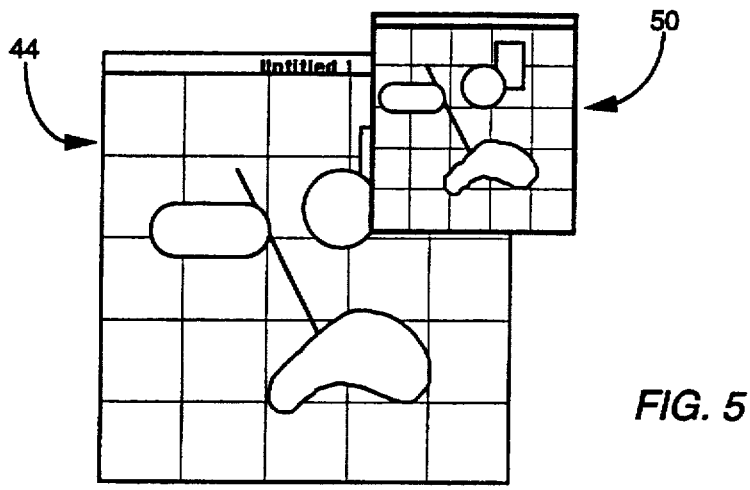
FIG. 5 shows multiple views of the root drawing part.
Figure 6:
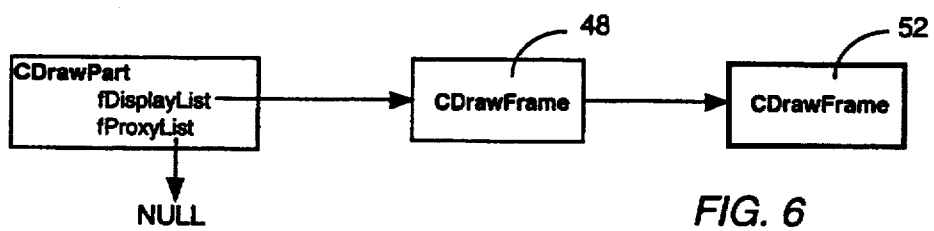
FIG. 6 is a block diagram of the embedding data structure for the views shown in FIG. 5.

The component architecture permits users to open multiple views of a part on the display device. For example, when the part is first created, as shown in FIG. 3, it might be displayed within a frame structure. The user may also desire to view the part within a window, to scroll the displayed contents of the part. To do so, the user can invoke a command provided by the user interface, which causes a second view 50 of the part to appear within a window, as shown in FIG. 5. FIG. 6 illustrates the display list and proxy list portions of the run-time data structure that is associated with the part in this case. As can be seen, a new display frame 52 has been added to the entries on the display list, to represent the second view of the part. The frame itself is created by the component architecture, and the entry on the display list is created by the framework.

Figure 7:
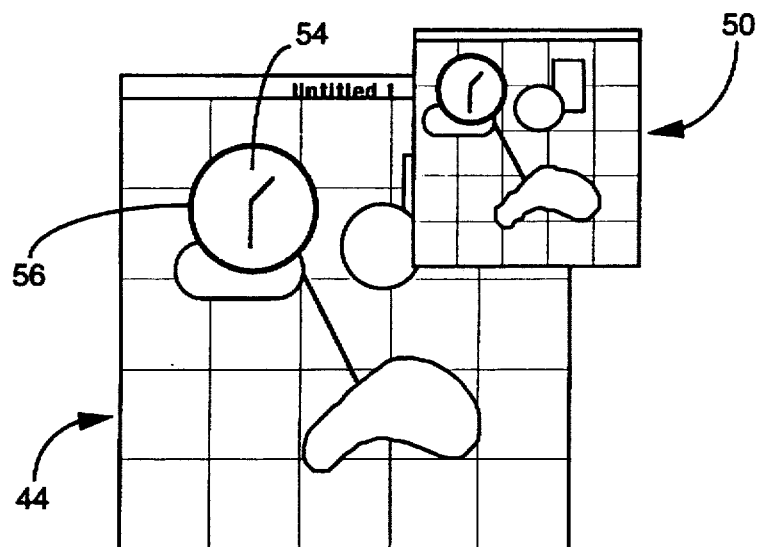
FIG. 7 shows multiple views of the root drawing part with a first embedded part.

The component architecture also allows the user to place other parts within the part of interest. FIG. 7 illustrates an example in which the user has dragged a clock part into the document 44. Performing this action causes a clock image 54 to appear in both the original document 44, as well as the window 50 which also displays the drawing part. To accomplish this result, an embedded frame 56 is placed within the root part 44. The root part treats this frame in a manner similar to the other graphical objects listed in its data structure. Thus, for instance when the part 44 is displayed on the computer's monitor 28, the frame 56 is drawn at a designated location and size. This frame differs from the other graphical objects, however, in that the drawing part has no control over the contents of the frame. Rather, the manipulation of the clock, for example changing its time, is carried out by the clock part which controls the information within the frame. For further information regarding the relationships between embedding and embedded parts, and the manner in which control is transferred between them, reference is made to previously identified application Ser. No. 08/175,459.

Figure 8:
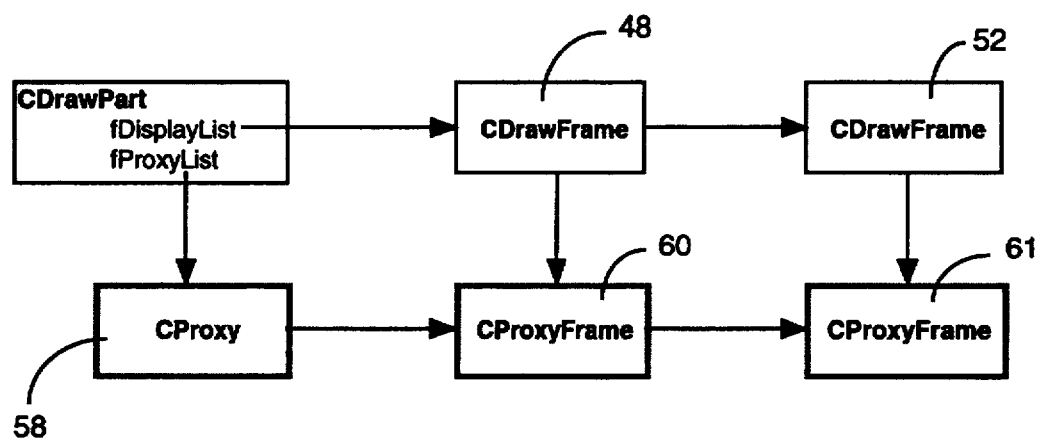
FIG. 8 is a block diagram of the embedding data structure for the views shown in FIG. 7.

In the example of FIG. 7, there are two views of the root part 44, and hence two embedded frames are displayed, one for each view of the embedding part. The clock part displays itself in each of these two embedded frames. The portion of the data structure that pertains to this example is illustrated in FIG. 8. Referring thereto, a proxy 58 is added to the list of objects in the data structure for the part. This proxy represents the embedded frame 56 in the part. The data associated with the proxy identifies the location and size of the embedded frame. For example, if the embedded frame has a rectangular shape, the proxy might specify where its top left and bottom right corners are located.

Since there are two views of the root drawing part, there are two display frames for the embedded clock part. Each display frame is represented by a respective proxy frame 60, 61 which is created by the framework. The two proxy frames are linked together by the proxy 58 for the embedded frame.

Figure 9:
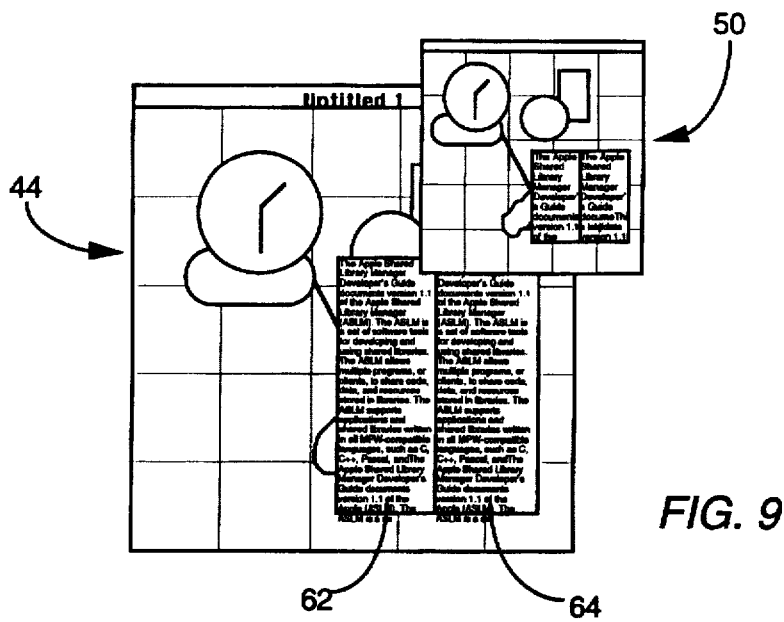
FIG. 9 shows multiple views of the root drawing part with another embedded part.
Figure 10:
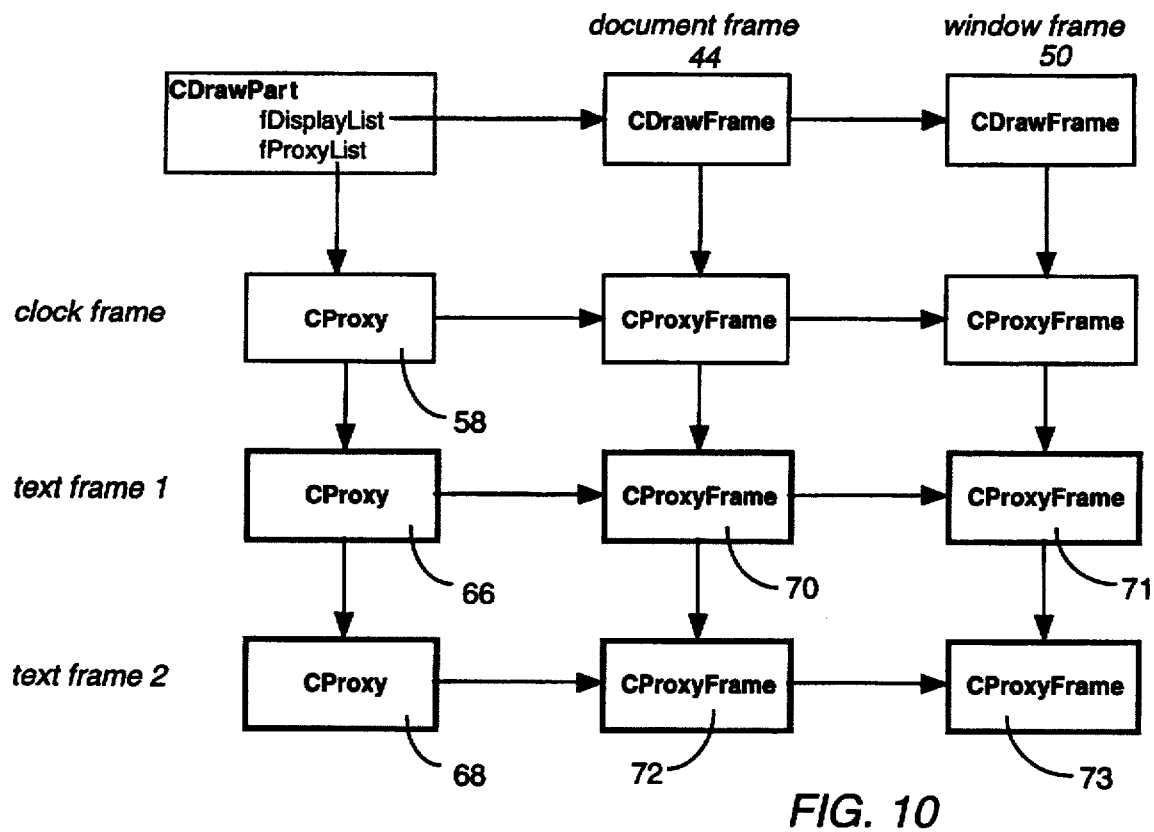
FIG. 10 is a block diagram of the embedding data structure for the views shown in FIG. 9.

Referring to FIG. 9, as a further example the user can drag an existing text part from another document into the root document 44. In this particular example, the text part displays its data in two frames, 62 and 64. When this occurs, the two frames appear in both views 44 and 50 of the part. The data structure corresponding to this example is illustrated in FIG. 10. As can be seen therein, two new proxies 66 and 68 have been created and added to the proxy list, one for each of the newly embedded frames 62 and 64. For each view of the part, a proxy frame 70, 71, 72 or 73 is created, and linked to the appropriate one of the proxies 66 or 68.

From FIG. 10 it can be seen that the data structure which is employed to support embedding of parts forms a matrix. Each row of the matrix corresponds to an embedded frame in the part. Each column of the matrix represents one of the views in which the part is displayed. Each cell in the matrix comprises a proxy frame that represents a respective one of the views of an associated embedded display frame. In other words, there is a proxy frame for each view of each embedded frame in the part.

The significance of this data structure is the fact that it allows the different views of the embedded frames to be synchronized with one another during the run time of the computer. For example, the user may decide to change the location of the clock part 54, or to enlarge the frames 62 and 64 in which the text part is displayed. Such actions might be carried out by the user in either of the two views of the document. When the user selects a display frame in either view to make a change to its size and/or location, the proxy frame associated with that display frame is called. The proxy frame in turn notifies the proxy to which it is linked, which updates the display data regarding the frame's size and location. This information is also provided to the other proxy frames linked to the proxy. The proxy frames instruct the actual display frames to update their sizes and locations accordingly. Thus, as the user changes the location of the clock in the original root part 44, its displayed location in the window view 50 also changes correspondingly.

From the foregoing, it can be seen that the present invention provides a procedure for embedding parts within other parts, in a manner which synchronizes the size and shape of corresponding embedded frames to one another in different display views. The proxies themselves keep track of all of the embedded frames, and control their manipulation, e.g. resizing, moving, etc., so that the data structure for the part does not have to do so. Furthermore, the proxies can also be responsible for saving the information regarding the proxy frames to permanent storage, e.g. the hard disk 20, and drawing the embedded frames when data for a part is read from the disk. This function supports cloning of the part, where multiple copies of the part can be created, and frame paging. More particularly, if a part containing an embedded frame is displayed in a window, and the window is scrolled such that the embedded frame is no longer visible, it is not necessary to maintain data regarding the frame in the main memory of the computer. Rather, this data can be stored on the hard disk, and the proxy frame need only consist of a pointer to the location of the frame's data. In other words, the run-time data structure fro the part does not have to contain information for drawing objects which are not currently visible.

It will be appreciated by those of ordinary skill in the art that the present invention can be embodied in other specific forms without departing from the spirit or essential characteristics thereof. For example, in the illustrated embodiments, the part is shown as being directly linked to the proxies, which provide indirect links to the proxy frames. Alternatively, the proxy frames can be directly linked to the part, rather than the proxy itself. In this case, each proxy frame is still linked with a proxy to which all other proxy frames in a row of the matrix. The presently disclosed embodiments are therefore considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. In a user interface for a computer, of the type in which a part that forms a component of a document can be contained within another part that forms a component of the document, a method for maintaining synchronized multiple views of a part which is embedded within another part, comprising the steps of:

displaying a first part on a display monitor for said computer in a first view;

creating a data structure for said first part, said data structure comprising a first list which identifies each view of said first part that is currently being displayed on said display monitor, and a second list which identifies each part that is embedded within said first part;

placing a second part in said first part, wherein said second part has a specific positional relationship to said first part and becomes embedded therein;

adding an identification of said second part to said second list of said first part, said identification including information pertaining to said positional relationship;

creating a second view of said first part on said display monitor, said second view including said embedded second part with said positional relationship; and adding said second view to said first list of said first part.

2. The method of claim 1 further including the steps of:

changing said positional relationship of said second part relative to said first part in one of said views;

updating the information in said second list of said first part to correspond to the changed positional relationship; and updating the display of the second part in the other of said views in accordance with the updated information in said second list of the first part.

3. The method of claim 1 further including the step of representing said first list and said second list as a matrix in which one axis of said matrix contains an identification of each view of said first part and the other axis thereof contains an identification of each part that is embedded in the first part, and which comprises individual cells that respectively pertain to each view of each embedded part that is contained in the first part.

4. The method of claim 1 wherein the step of placing a second part in said first part includes the steps of creating a display frame within said first part, displaying said second part within said display frame, and adding a proxy frame to said data structure which represents said display frame.

5. The method of claim 2 wherein each embedded part that is identified on said second list has a proxy associated therewith, and wherein said data structure further includes a representation of each embedded part identified on said second list for each view of said first part that is identified on said first list.

6. The method of claim 5 wherein the step of updating the information in said second list comprises sending a notification from the representation associated with the view of the embedded part in which said positional relationship was changed to the proxy associated with that part, and the step of updating the display comprises sending a notification from said proxy to all other representations of said embedded part.

7. In a user interface for a computer, of the type in which a part that forms a component of a document can be contained within another part that forms a component of the document, a method for embedding one part within another part, comprising the steps of:

displaying a first part on a display monitor for said computer;

creating a data structure for said first part, said data structure comprising a first list which identifies each view of said first part that is currently being displayed on said display monitor, and a second list which identifies each part that is embedded within said first part;

placing a second part in said first part, wherein said second part has a specific positional relationship to said first part and becomes embedded therein; and adding an identification of said second part to said second list of said first part, said identification including information pertaining to said positional relationship.

8. The method of claim 7 wherein the step of placing a second part in said first part includes the steps of creating a display frame within said first part, displaying said second part within said display frame, and adding a proxy frame to said data structure which represents said display frame.

9. The method of claim 7 wherein each embedded part that is identified on said second list has a proxy associated therewith, and wherein said data structure further includes a representation of each embedded part identified on said second list for each view of said first part that is identified on said first list.

10. The method of claim 9 further including the step of detecting a change in one of views of an embedded part, sending a notification of the change from the representation corresponding to said one view to the proxy associated with said embedded part, and providing a notification of the change from said proxy to all other representations of said embedded part.

11. In a user interface for a computer, of the type in which a part that forms a component of a document can be contained within another part that forms a component of the document, a method for maintaining synchronized multiple views of a part which is embedded within another part, comprising the steps of:

displaying a first part on a display monitor for said computer;

placing a second part in said first part, wherein said second part has a specific positional relationship to said first part and becomes embedded therein;

creating a data structure for said first part, said data structure comprising a first list which identifies each view of said first part that is currently being displayed on said display monitor, and a second list which identifies each part that is embedded within said first part; and representing said first list and said second list in said data structure as a matrix, in which one axis of said data structure contains an identification of each view of said first part and the other axis thereof contains an identification of each part that is embedded in the first part, and which comprises individual cells that respectively pertain to each view of each embedded part that is contained in the first part.

12. The method of claim 11 wherein said first part and said embedded second part are displayed on said display monitor in multiple views, and further including the steps of:

changing said positional relationship of said second part relative to said first part in one of said views;

updating the information in each cell of said matrix which pertains to said second part, to correspond to the changed positional relationship; and updating the display of the second part in the other views in accordance with the updated information in said cells.

13. A data structure that is stored in the memory of a computer having a user interface of the type in which a part that forms a component of a document can be contained within another part that forms a component of the document, said data structure comprising:

a first list which identifies each view of said first part that is currently being displayed on a display monitor for the computer; and a second list which identifies each part that is embedded within said first part.

14. The data structure of claim 13 wherein said first list and said second list define a matrix in which one axis of said matrix contains an identification of each view of said first part and the other axis thereof contains an identification of each part that is embedded in the first part, and which comprises individual cells that respectively pertain to each view of each embedded part that is contained in the first part.

15. A system for displaying a compound document comprising at least a first part and one or more second parts which are contained within said first part, comprising:

a display device for displaying multiple views of said first part and the contained second parts;

a memory storing a data structure which describes said first part, said data structure including a first list which contains a representation for each view of said first part that is displayed on said display device, and a second list which contains a proxy for each second part that is contained within said first part; and means for drawing on said display device each view of said first part that is represented in said first list, and, for each view of the first part, a view of each second part having a proxy on said second list.

16. The system of claim 15 wherein said data structure further includes a representation of each second part having a proxy on said second list for each view of said first part that is represented on said first list.

17. The system of claim 16 further including means responsive to a change in one of said views of a second part for providing a notification of the change from the representation corresponding to said one view to the proxy associated with said second part, and for providing a notification of the change from said proxy to all other representations of said second part.

18. The system of claim 16 wherein said data structure further includes a representation of each embedded part having a proxy on said second list for each view of said first part that is represented on said first list.

19. A system for displaying a compound document comprising at least a first part and one or more second parts which are contained within said first part, comprising:

a display device for displaying multiple views of said first part and the contained second parts;

a memory storing a data structure which describes said first part, said data structure including a first list which contains a representation for each of the multiple views of said first part that are displayed on said display device, and a second list which contains a proxy for each second part that is contained within said first part;

means for detecting a change of a second part in one of said views, providing a notification of the change from the representation corresponding to said one view to the proxy associated with said second part, and providing a notification of the change from said proxy to the representations corresponding to all other views; and means for updating the display of each of the views of said first part to reflect the change in the second part.

20. The system of claim 19 wherein said data structure further includes a representation of each second part having a proxy on said second list for each view of said first part that is represented on said first list.

21. The system of claim 19 wherein the detected change is a change of the location of the second part within said first part.

22. A method for providing a synchronized display of multiple views of a compound document comprising at least a first part and one or more second parts which are contained within said first part, comprising the steps of:

displaying multiple views of said first part and the contained second parts;

storing a data structure which describes said first part, said data structure including a first list which contains a representation for each of the multiple views of said first part that are displayed on said display device, and a second list which contains a proxy for each second part that is contained within said first part;

detecting a change of a second part in one of said views;

providing a notification of the change from the representation corresponding to said one view to the proxy associated with said second part;

providing a notification of the change from said proxy to the representations corresponding to the other views; and updating the display of each of the views of said first part to reflect the change in the second part.

23. The method of claim 22 wherein said data structure further includes a representation of each second part having a proxy on said second list for each view of said first part that is represented on said first list.

24. The method of claim 22 wherein the detected change is a change of the location of the second part within said first part.

* * * * *